(12) United States Patent
Panikkar et al.

(10) Patent No.: US 7,672,335 B2
(45) Date of Patent: Mar. 2, 2010

(54) NON-INTEGER WORD SIZE TRANSLATION THROUGH ROTATION OF DIFFERENT BUFFER ALIGNMENT CHANNELS

(75) Inventors: Adarsh Panikkar, Tacoma, WA (US); Wayne C. Ashby, San Jose, CA (US); Abhimanyu Kolla, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 1781 days.

(21) Appl. No.: 10/733,100

(22) Filed: Dec. 10, 2003

(65) Prior Publication Data

US 2005/0129070 A1  Jun. 16, 2005

(51) Int. Cl.
*H04J 3/00* (2006.01)
(52) U.S. Cl. .............. 370/476; 370/506; 370/509; 708/490; 713/600; 711/109; 711/201
(58) Field of Classification Search .......... 370/506; 708/490; 711/201
See application file for complete search history.

(56) References Cited

U.S. PATENT DOCUMENTS

| 5,860,086 | A | * | 1/1999 | Crump et al. ............ 711/109 |
| 5,903,619 | A | * | 5/1999 | Chaisemartin ........... 375/366 |
| 6,009,488 | A |   | 12/1999 | Kavipurapu ............. 710/105 |
| 2002/0018444 | A1 |   | 2/2002 | Cremin et al. ........... 370/235 |
| 2004/0243752 | A1 | * | 12/2004 | O'Connor et al. ........ 710/243 |

* cited by examiner

*Primary Examiner*—Chi H. Pham
*Assistant Examiner*—Shick Hom
(74) *Attorney, Agent, or Firm*—Blakely, Sokoloff, Taylor & Zafman LLP (57) ABSTRACT

A method is described that involves loading X bits at a time into a shift register and shifting groups of older, loaded X bits up in the shift register with each new group of loaded X bits. Each group of X bits has been received from a serial data stream. The method further involves identifying an alignment key within the shift register and presenting aligned data from the serial data stream by rotating selection of a first group of Y contiguous bits from the shift register and a second group of Y contiguous bits from the shift register after the identifying. Y is greater than X.

29 Claims, 6 Drawing Sheets

NON-INTEGER WORD SIZE TRANSLATION THROUGH ROTATION OF DIFFERENT BUFFER ALIGNMENT CHANNELS

FIELD OF INVENTION

The field of invention relates generally to the field of electronic circuit design; and, more specifically, to non-integer word size translation through rotation of different buffer alignment channels.

BACKGROUND

Figure 1:
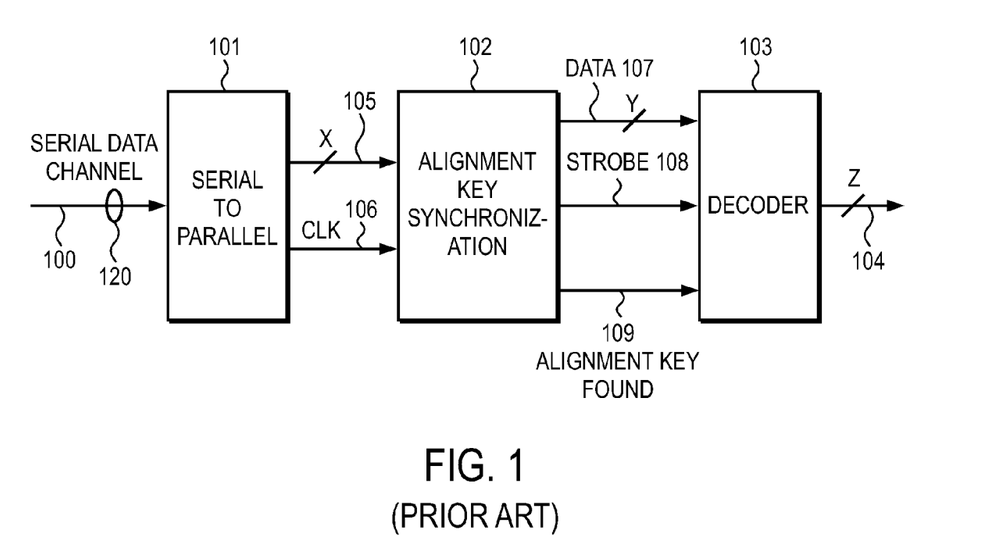
FIG. 1 (prior art) shows an embodiment of a receive channel including a serial data channel.

A serial data channel is used to transport binary information (e.g., in single ended or differential format) one bit at a time. FIG. 1 shows an exemplary depiction of a receive channel that includes a serial data channel 100. The serial data channel 100 is typically implemented with copper or fiber optic cabling (which is typically attached at an industry standard connector 120 (e.g., a BNC connector) and is coupled to a serial-to-parallel conversion block 101. The serial-to-parallel conversion block 101 effectively converts a number of bits received from the serial data channel 100 into a word of data of width X that is presented at output 105. The serial-to-parallel conversion block also includes a clock output 106. The clock provided at output 106 typically has a frequency that is equal to the frequency at which new words are presented at output 105 (i.e., CLK/X where the frequency of CLK corresponds to the baud rate of the serial data channel).

Other functions that may be performed by the serial-to-parallel conversion block 101 include optical-to-electrical conversion (O/E), amplification and clock extraction. O/E is used if the serial data channel 100 is actually implemented with an optical transport mechanism. Amplification is used when the serial data channel 100 traverses long distances and the transported signals are weakened as a consequence. Clock extraction is the derivation of the frequency of the clock used to transmit data onto the serial data channel from the data that is received on the serial data channel. A photodetector is often used for O/E, amplifier circuitry is often used for amplification; and, phase locked loop circuitry is often used for clock extraction.

An alignment key synchronization block 102 is used to synchronize or "align" the stream of 1s and 0s received on the serial data channel 100. Here, data carried over the serial data channel 100 is viewed as being organized into a series of words (e.g., where each word is a ten bit block of data). The alignment key synchronization block 102 is responsible for deciding where the boundaries of neighboring words reside in the stream of 1s and 0s that are received from the serial data channel 100. Typically a specific word pattern (e.g., a specific 10 bit word pattern), referred to as an alignment key, is embedded into the serial data channel's data stream at the transmitting source.

By looking for and recognizing the presence of the alignment key, the alignment key synchronization block 102 is able to precisely determine the word boundaries within the serial data channel's 100 data stream. In a typical embodiment, the alignment key found output 109 triggers to an active state when the alignment key is discovered in the data stream; and, subsequently, correctly aligned words from the serial data channel's data stream are provided at output 107. Thus, for example, if the serial data stream is organized into ten bit words, Y=10 or some integer multiple thereof. Moreover, as just mentioned above, the data is properly aligned at output 107 such that the least significant bit and the most significant bit of the Y wide output correspond to word "endpoint" bits within the serial data stream. The strobe output 108 provides a clock that times the presence of each new output word presented at output 107.

A decoder 103 decodes the aligned words that are presented at the alignment key synchronization block data output 107 into smaller words of data that correspond to the actual, substantive data that the serial data channel is used to transport. Here, on the transmit side, the actual substantive data that is to be transported by the serial data channel is first encoded in order to prevent data corruption in cases of long run lengths of the same binary value (e.g., a long run length of 1s or a long run length of 0s). The decoder 103 reverses the encoding process. Typically, a decoded word that corresponds to actual substantive data is provided at output 104 for each aligned word provided at the alignment key synchronization block output 107. Owing to the nature of encoding schemes, some inefficiency is associated with the decoding process in that more bits are needed to transport encoded data (as compared to un-encoded data). As such, the per word width at output 104 is less than the per word width at output 107 (i.e., Y>Z).

Note that, in cases where the serial-to-parallel block 101 does not form words of the same size as the words that are formed into the serial data stream, the alignment key synchronization block 102 also performs some degree of parallel word size translation from an input word of width X to an output word of width Y. Typically Y is greater than X. In cases where the output word width Y is an integer multiple of the input word width X (e.g., X=4 and Y=8), the parallel word size translation is straightforward to design. However, in cases where the output word width Y is not an integer multiple of the input word width X (e.g., X=4 and Y=10), the parallel word size translation can be much more complicated to design and, to the knowledge of the Applicants, has heretofore required the use of dual edge triggered flip flops.

FIGURES

The present invention is illustrated by way of example, and not limitation, in the figures of the accompanying drawings in which like references indicate similar elements and in which:

FIG. 3b shows a representation of exemplary buffer selections for a set of alignment channels and corresponding timing for the methodology of FIG. 3a;

DETAILED DESCRIPTION

Figure 2:
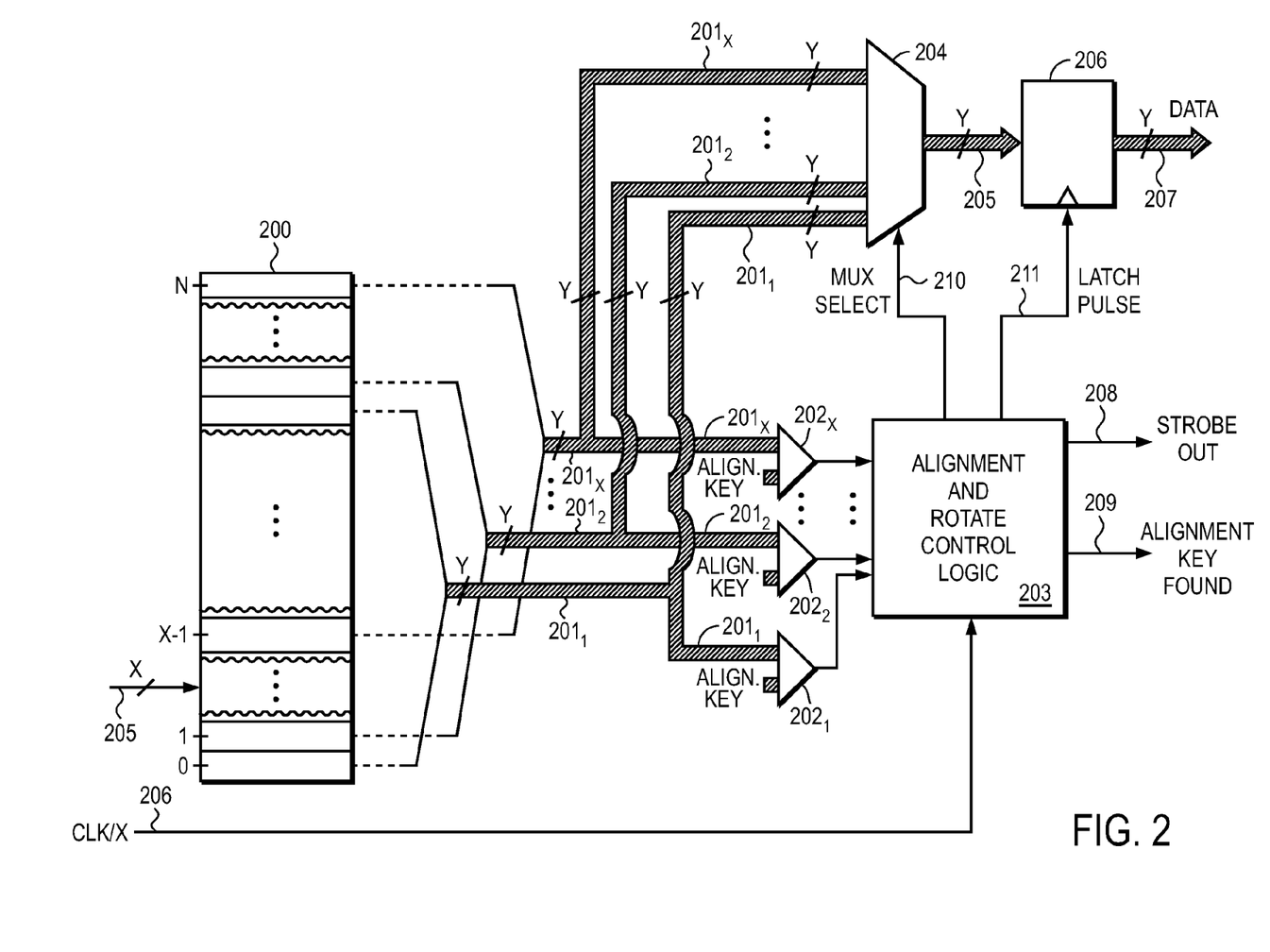
FIG. 2 shows an architecture for an alignment key synchronization block circuit capable of non integer word size translation.

FIG. 2 shows an embodiment of an improved alignment key synchronization circuit that is capable of non-integer word size translation and that can be designed with "singled edged" triggered logic circuit elements (e.g., latches, flipflops, counters, etc. that are not dual edge triggered). The alignment key synchronization circuit of FIG. 2 includes an input buffer 200 (which may be implemented as a parallel load shift register) from which multiple alignment channels $201_1$ through $201_x$ emanate. The input buffer 200 accepts X bits in parallel at input 205 (which may be viewed as the parallel load input) at a frequency of CLK/X where CLK is the frequency of the baud rate of the serial data channel. For each new input word of width X received at input 205, the input buffer shifts previously loaded X wide input words "up" in the shift register. The input buffer 200 therefore provides a history of the previous N bits to be loaded into the shift register where N is the bit size of the input buffer. As described in more detail below, N does not need to be an integer multiple of X.

Each alignment channel is designed to select a different selection of Y contiguous bits from the input buffer 200. Here, Y is the width of the output word which is provided at the alignment key synchronization circuit output 207. The alignment key synchronization circuit is designed to present a Y wide output word at output 207 by forwarding the Y bits selected by a specific one of the alignment channels $201_1$ through $201_x$ and presenting them at output 207. Multiplexer 204 and the state of its channel select control input 210 determine which alignment channel is actually selected for the purposes of presenting an output word. The particular architecture of FIG. 2 applies to approaches where the looked for alignment key is the same size as the output word (i.e., alignment key size=Y). Other architectures where the alignment key size is different than the output word size are discussed toward the end of this detailed description.

Figure 3A:
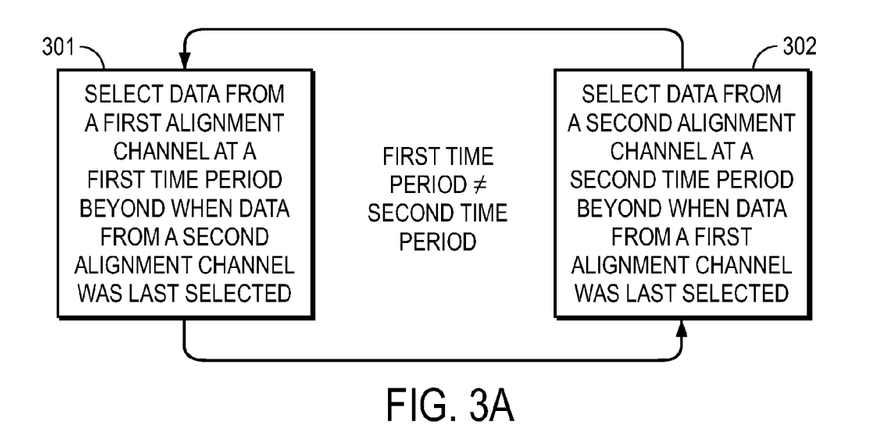
FIG. 3a shows a methodology performed by the alignment key synchronization block circuit observed in FIG. 2.
Figure 3B:
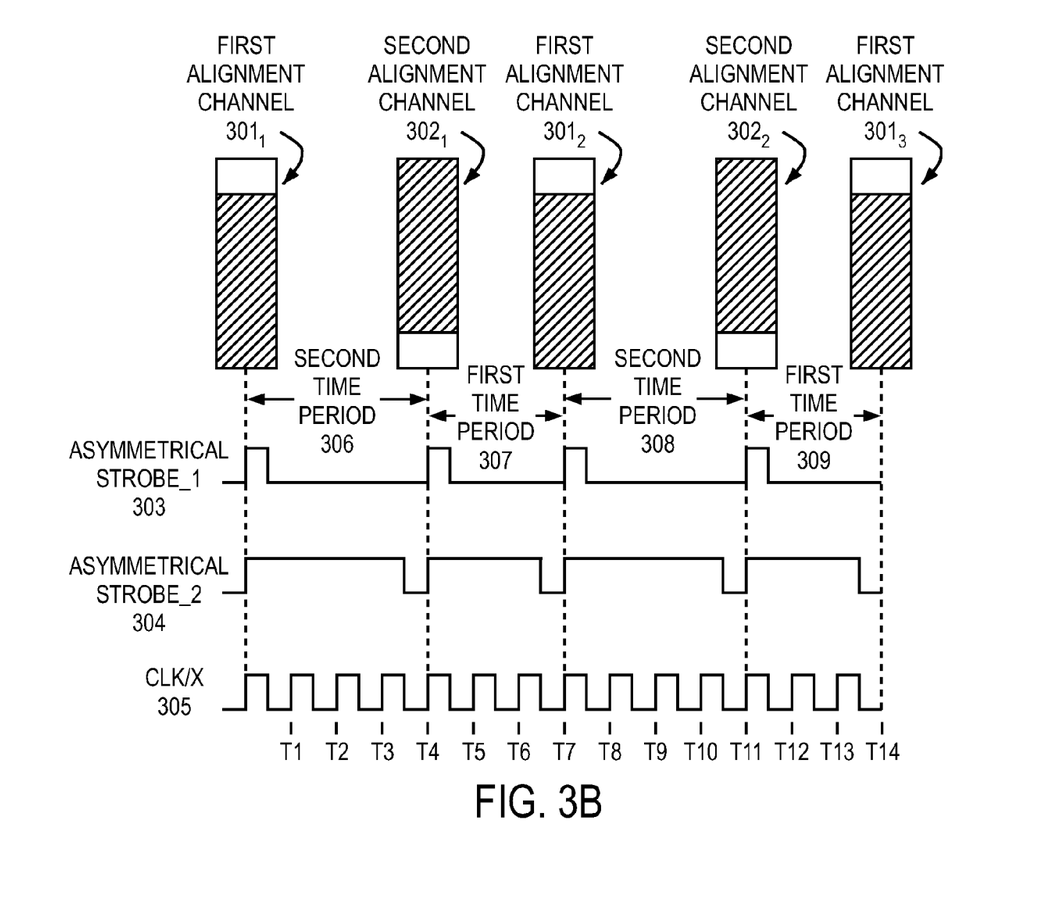

Owing to the nature of non integer word size translation, and as described in more detail below, alignment channels are "rotated". That is, in order to provide for proper non integer word size translation, a pair of alignment channels are identified and are repeatedly selected in an alternating fashion for purposes of presenting their corresponding Y bits at output 207. Repeatedly selecting the pair of alignment channels in an alternating fashion may be viewed as a form of rotation of the alignment channels. FIGS. 3a and 3b elaborate on this rotation in more detail. FIG. 3a shows a circular methodology representative of the rotation. FIG. 3b shows a representation of exemplary buffer selections for a set of alignment channels and corresponding timing.

According to the methodology of FIG. 3a, during a first stage of rotation 301, data from a first alignment channel (i.e., the set of Y bits specific to the first alignment channel) is selected at a first time period beyond when data from a second alignment channel (i.e., the set of Y bits specific to the second alignment channel) was last selected. Referring to FIG. 3b, alignment channel $301_2$ can be viewed as the first alignment channel (shown as an input buffer having a shaded region to represent the first alignment channel's corresponding set of Y contiguous bits) that is selected during a first rotational stage; and, time period 307 can be viewed as a first time period beyond the most recent selection of a second alignment channel $302_1$ (shown as an input buffer having a different shaded region to represent the second alignment channel's corresponding set of Y contiguous bits).

Moreover according to the methodology of FIG. 3b, during a second stage of rotation 302, data from the second alignment channel is selected at a second time period beyond when data from the first alignment channel was last selected. Again, referring to FIG. 3b, alignment channel $302_2$ can be viewed as the second alignment channel (shown as an input buffer having the same shaded region as second alignment channel $302_1$) that is selected during a second rotational stage; and, time period 308 can be viewed as a second time period beyond the most recent selection of the first alignment channel $301_2$. First alignment channels $301_1$ and $301_3$ and first time periods 306 and 309 of FIG. 3b, when viewed with aforementioned first alignment channel $301_2$, second alignment channels $302_1$ and $302_2$, first time period 307 and second time period 308, demonstrate the circular notion of the rotating alignment selection scheme.

Note also from FIGS. 3a and 3b that the first time period is not equal to the second time period. In the exemplary timing diagrams of FIG. 3b, the first time period is three CLK/X clock cycles; and, the second time period is four CLK/X clock cycles. This artifact causes the output strobe signal to be asymmetrical. Referring briefly back to FIG. 2, an output strobe signal indicates when a new output word is available at output 207. Note that the circuit of FIG. 2 includes a strobe signal output node 208 for the purposes of providing an output strobe signal. FIG. 3b shows two possible output strobe signals. A first output strobe signal 303 is a "single shot" type where a new output word is indicated by a thin pulse. Output strobes having wider pulses to indicate the presence of a new output word are also possible as observed with respect to strobe signal 304.

Because an entire pulse exists for each new output word rather than just a logical transition, as described in more detail below, the strobe circuitry can be crafted with single edge triggered logic elements. Note also, as alluded to above, the output strobe signals 303, 304 are asymmetrical. That is, neighboring pulses have unequal temporal spacing from any pulse in the train of pulses observed in the strobe signal. This follows naturally from the different first and second time periods described above with respect to the rotational alignment channel selection scheme.

Referring back to FIG. 2, latch 206 is used to latch the contents of a specific alignment channel from multiplexer 204 so that they may be presented at output 207 until the next alignment channel in the rotation is selected. Here, alignment and rotate control logic 203 is responsible for determining the content and the timing of the multiplexer 204 channel select input 210; which, in turn, corresponds to: 1) determining which pair of alignment channels from the family of alignment channels $201_1$ through $201_x$ are to be used in the rotational scheme; and, 2) controlling the timing of the rotational selection process. FIGS. 4 through 6a,b, which are discussed in more detail further below, elaborate on a possible design for an alignment and rotate control logic circuit 203 for a word translation ratio of 4:10 (i.e., X=4 and Y=10). However, before discussing FIGS. 4 through 6a,b, note that the outputs from the bank of comparators $202_1$ through $202_x$ are used by the alignment and rotate control logic circuitry 203 to determine the pair of appropriate alignment channels.

Recall from the background that an alignment key synchronization circuit is used to synchronize or "align" the stream of 1s and 0s received on the serial data channel. Here, data carried over the serial data channel is viewed as being organized into a series of words (e.g., where each word is a ten bit block of data). An alignment key synchronization circuit is responsible for deciding where the boundaries of neighboring words reside in the stream of 1s and 0s that are received from the serial data channel. Typically a specific word pattern (e.g., a specific 10 bit word pattern), referred to as an alignment key, is embedded into the serial data channel's data stream at the transmitting source. By looking for and recognizing the presence of the alignment key, the alignment key synchronization circuit is able to precisely determine the word boundaries within the serial data channel's data stream.

According to the alignment key synchronization circuit architecture of FIG. 2, a bank of comparators $202_1$ through $202_x$ are used to identify the presence of the alignment key within the input buffer. Moreover, the bank of comparators $202_1$ through $202_x$ are designed to detect the presence of an alignment key within the bit history of the serial data channel that is stored in the input buffer 200 irrespective of which bit of the X bits of the input word presented at input corresponds to the last bit (or endpoint) of the alignment key. Better said, assuming the alignment key word length is greater than X, a plurality of input words of length X will need to be stored into the input buffer 200 before the input buffer 200 will be able to be fully recognized. The last input word to contain alignment key matter, by definition, will posses the endpoint of the alignment key.

However, the endpoint of the alignment key may be located at any of the X bits of the last input word to contain alignment key matter. Therefore, a bank of comparators $202_1$ through $202_x$ are used to identify the presence of the alignment key within the input buffer, irrespective of the specific set of contiguous bits the alignment key occupies within the input buffer once the alignment key fully presents itself. As the alignment channels $201_1$ through $201_x$ together are able to select any combination of Y bits, assuming the alignment key is also Y bits in length, the contents of each of the alignment channels can be directly compared against the sought-for alignment key to detect the presence and orientation of the alignment key with the input buffer 200.

For example, if comparator $202_1$ indicates a positive match, it is understood that the alignment key is located in bit positions 0 through Y−1; if comparator $202_2$ indicates a positive match, it is understood that the alignment key is located in bit positions 1 through Y; . . . , etc,; and, if comparator $202_x$ indicates a positive match, it is understood that the alignment key is located in bit positions X−1 through X+Y−2. Therefore the non integer word size translation can be accomplished with buffer 200 sizes as small as X+Y−1 bits. According to one perspective, the output of the bank of comparators $202_1$ through $202_x$ can be viewed as a one hot encoded vector that indicates the presence and orientation of the alignment key within the input buffer 200.

FIGS. 4a, 4b, 5, 6a and 6b discuss a specific embodiment that performs four bit to ten bit word size translation. The details of this specific embodiment will bring forward certain generic perspectives that can be applied to word size translation circuits that perform something other than a four to ten bit word size translation. These are discussed toward the end of this detailed description so that the reader can appreciate and apply the teachings enclosed herein toward such alternate word translation schemes.

Figure 4A:
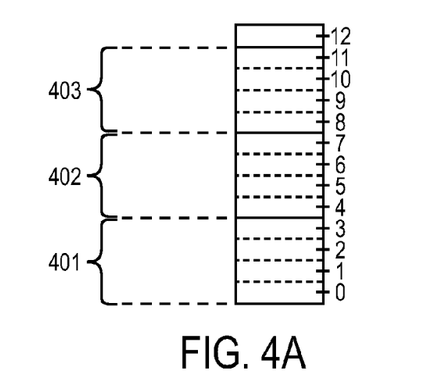
FIG. 4 shows a possible alignment selection pairs for a 4:10 word size translation scheme.

FIG. 4a shows an embodiment of a buffer that could be used as buffer 200 in FIG. 2 for a 4:10 word translation scheme (i.e., X=4; Y=10). Note that the buffer is 13 bits in size which corresponds to X+Y−1=4+10−1. Because the input word size X=4, the buffer can be viewed as being capable of storing the most recent three input words and an extra bit. That is, consistent with the notion that input words are "shifted up" into the buffer with each newly received word: 1) the most recently received input word occupies bit locations 401 (i.e., bits 0 through 3); 2) the second most recently received input word occupies bit locations 402 (i.e., bits 4 through 7); and, 3) the third most recently received input word occupies bit locations 403 (i.e., bits 8 through 11). The bit of the fourth most recently received input word that occupied bit locations 0, 4, and 8 (when the fourth most recently received input word was regarded, respectively, as the most, second most and third most recently received input words) occupies bit location 12.

Figure 4B:
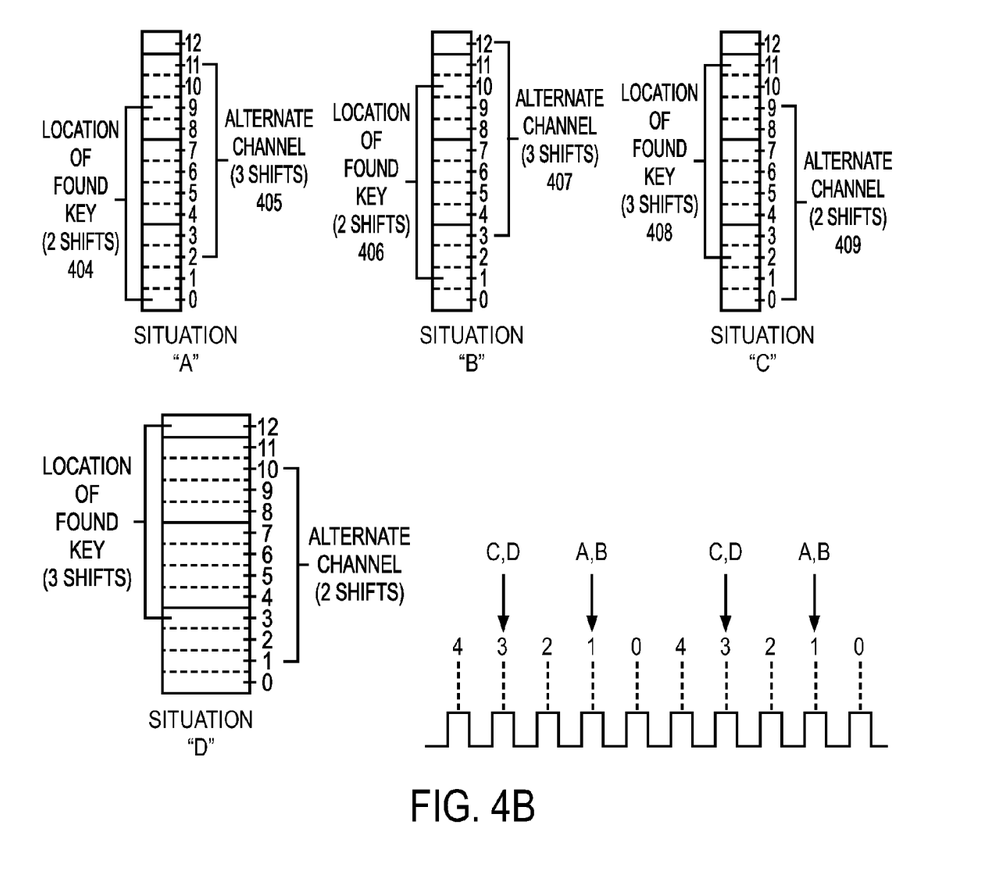

FIG. 4b shows a plurality of different "situations" in which the looked for alignment key of size Y=10 might first present itself within the buffer of FIG. 4a. Situation "A" corresponds to the situation in which the alignment key first appears in the buffer by occupying bits 0 through 9. Situation "B" corresponds to the situation in which the alignment key first appears in the buffer by occupying bits 1 through 10. Situation "C" corresponds to the situation in which the alignment key first appears in the buffer by occupying bits 2 through 11. Situation "D" corresponds to the situation in which the alignment key first appears in the buffer by occupying bits 3 through 12.

Each of the four situations of FIG. 4b respectively outline the above described bit fields on the left hand side of the corresponding buffer. These demarcations may be viewed as defining one of the alignment channels that will be selected by the alignment and rotate control logic 203 during alternate rotational stages of the word size translation process. On the right hand side of the buffer, for each situation depicted in FIG. 4b, a demarcation is observed that defines the "other" alignment channel to be selected by the alignment and rotate control logic for harmonious word size translation.

That is, referring to situation A as an example, if the alignment key is first found occupying bits 0 through 9; then, the alignment and rotate control logic 203 should select the channel that selects bits 0 through 9 of the buffer. In order to properly present the next 10 bits in the data stream, three immediately following input words need to be received and shifted into the buffer (because two immediately following words will only supply eight "next" bits and ten "next" bits are needed).

When the third input word following the alignment key arrives and is loaded into the buffer, the "next" ten bits that immediately follow the alignment key in the received data stream will be located at bit positions 2 through 11. As such, the demarcation outlined to the right of the buffer in situation "A" spans bit positions 2 through 11. Following a similar logic, note that the "next" ten bits following the just above described selection of bit positions 2 through 11 will force a selection of bit locations 0 through 9. Hence, as discussed, the proper sequence of bits can be presented by rotating the selection of a pair of channels.

A couple characteristics are worth mentioning. Firstly, note that for the 4:10 word translation scheme being discussed only the four situations observed in FIG. 4b above are possible. Here, in order to find an alignment key as soon as a full alignment key resides within the buffer, at least one bit of the whole alignment key must reside within the most recently input word (i.e., at least one bit must occupy bit locations 0 through 3). The four situations outlined in FIG. 4b correspond to the four situations in which at least one newly received bit of an alignment key resides within bit locations 0 through 3.

Secondly, note that the appropriate "other" channel to be selected besides the channel in which the alignment key is found (for any workable rotating pattern of selected channels) can be readily determined by "rolling" forward two bit positions in the buffer (where rollover from bit 12 to bit 0 is preserved) from the location where the alignment key is found. As such, the "other" channel can be determined by execution of a relatively simple function.

Thirdly, note that the asymmetry results in the timing of the selection of the pair of channels. Better said, referring to the detailed analysis provided just above with respect to the alternating selection of bits 0 through 9 and 2 through 11 in situation "A", note that three new input words (corresponding to three separate shifts of data in the buffer) need to be received before the channel corresponding to bits 2 through 11 can be selected; and, after selection of the channel that corresponds to bits 2 through 11, two new input words (corresponding to two separate shifts of data in the buffer) need to be received before the channel corresponding to bits 0 through 9 can be selected. As such, referring also to FIG. 2, three cycles of CLK/X need to be endured before the channel corresponding to bits 2 through 11 can be selected; and, afterward, two cycles of CLK/X need to be endured before the channel corresponding to bits 0 through 9 can be selected. This property causes an asymmetrical strobe output as previously discussed with respect to FIG. 3b. FIG. 4b lists, for each channel demarcation, the number of shifts (or CLK/X cycles) that need to be endured before the data from the corresponding channel can be selected.

FIG. 4b also illustrates the timing asymmetry. Here, for convenience, the terms "A", "B", "C" and "D" are also used to define a specific channel. That is: 1) "A" may be regarded as the channel that corresponds to a selection of bits 0 through 9; 2) "B" may be regarded as the channel that corresponds to a selection of bits 1 through 10; 3) "C" may be regarded as the channel that corresponds to a selection of bits 2 through 11; 4) "D" may be regarded as the channel that corresponds to a selection of bits 3 through 12.

The timing diagram of FIG. 4b shows that a counter may be used to trigger the appropriate channel in accordance with the asymmetry. Specifically, if situation A presents itself (i.e., the alignment key is found in channel A), proper timing/operation may be achieved by: 1) setting a counter of modulo 5 to a value of "1" upon recognition of the alignment key; 2) selecting channel A each time the counter reaches a value of "1"; and, 3) selecting channel C (i.e., bits 2 through 11) each time the counter reaches a value "3". Likewise, if situation B presents itself (i.e., the alignment key is found in channel B), proper timing/operation may be achieved by: 1) setting a counter of modulo 5 to a value of "1" upon recognition of the alignment key; 2) selecting channel B each time the counter reaches a value of "1"; and, 3) selecting channel D (i.e., bits 3 through 12) each time the counter reaches a value "3".

By contrast, if situation C presents itself (i.e., the alignment key is found in channel C), proper timing/operation may be achieved by: 1) setting a counter of modulo 5 to a value of "3" upon recognition of the alignment key; 2) selecting channel C each time the counter reaches a value of "3"; and, 3) selecting channel A (i.e., bits 0 through 9) each time the counter reaches a value "1". Likewise, if situation D presents itself (i.e., the alignment key is found in channel D), proper timing/operation may be achieved by: 1) setting a counter of modulo 5 to a value of "3" upon recognition of the alignment key; 2) selecting channel D each time the counter reaches a value of "3"; and, 3) selecting channel B (i.e., bits 1 through 10) each time the counter reaches a value "1"

From the above, it is apparent that proper timing/operation can be achieved by triggering selection for specific channels at a specific counter value irrespective of where the alignment key is found (e.g., always triggering selection of channels A and B at a count value of "1" and always triggering selection of channels C and D at a count value of "3"). Moreover, proper timing/operation can be achieved by resetting a counter to start counting from a particular value upon reception of the alignment key and based upon the location of the alignment key (e.g., "1" for situations A and B and "3" for situations C and D).

Figure 5:
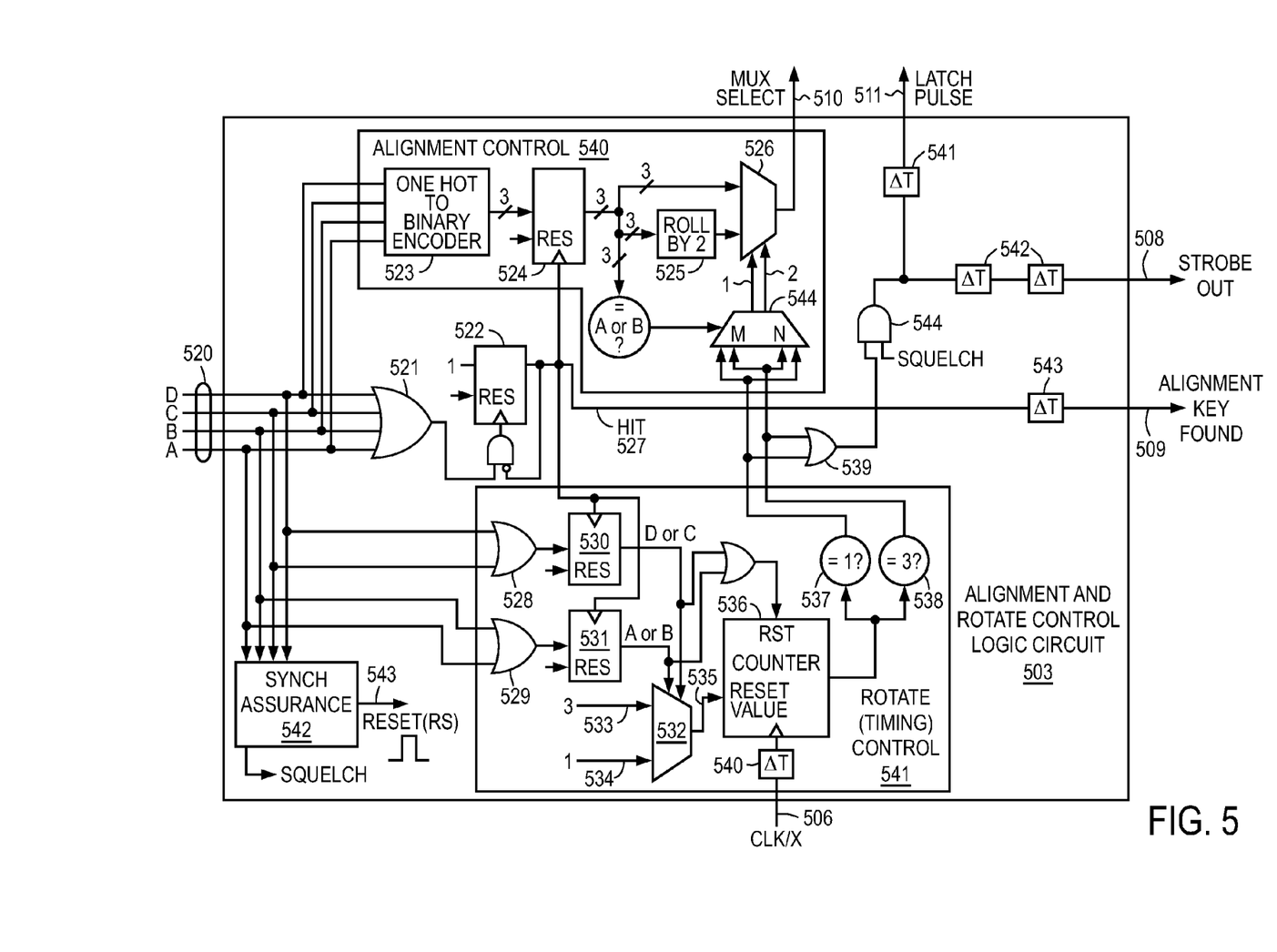
FIG. 5 shows an embodiment of an alignment and rotate control logic circuit that may be used for the alignment and rotate control logic circuit observed in FIG. 2 adapted for 4:10 word size translation.

FIG. 5 shows an embodiment of a alignment and rotate control logic circuit 503 that operates consistently with the principles outlined in the immediately preceding paragraph. Comparing the alignment and rotate control logic circuit 503 of FIG. 5 with the alignment and rotate control logic circuit 203 of FIG. 2, note that the mux select 503, latch pulse 511, strobe out 508 and alignment key found 509 outputs of FIG. 5 respectively corresponds to the mux select 203, latch pulse 211, strobe out 208 and alignment key found outputs 209 of FIG. 2.

The alignment and rotate control logic circuit of FIG. 5 is also specific to a 4:10 word translation scheme as described above with respect to FIGS. 4a and 4b. Therefore the buffer is assumed to be 13 bits in size from which four different channels can be selected (A, B, C and D). Referring to FIG. 2, this corresponds to X=4, Y=10, and N=12; where, comparator $202_1$ identifies an alignment key found in channel A and comparator $202_x = 202_4$ identifies an alignment key found in channel D. As such, referring back to FIG. 5, the input 520 to the alignment and rotate control circuit logic circuit 503 corresponds to the combined output from each of the four comparators ($202_1$ through $202_4$) and can be viewed as a one hot encoded vector that indicates which one of channels A, B, C and D corresponds to the channel where the alignment key is found.

If any of inputs 520 are activated so as to indicate that the alignment key has been found in a particular one of the channels A, B, C or D, the "hit" line 527 latches into an activated state. Essentially, OR gate 521 causes latch (or flip-flop) 522 to transition from a reset (inactivated) state to an activated state; and, once activated, the latch 522 remains in an activated state until it is again reset (e.g., upon the alignment key location being deemed "lost").

Figure 6A:
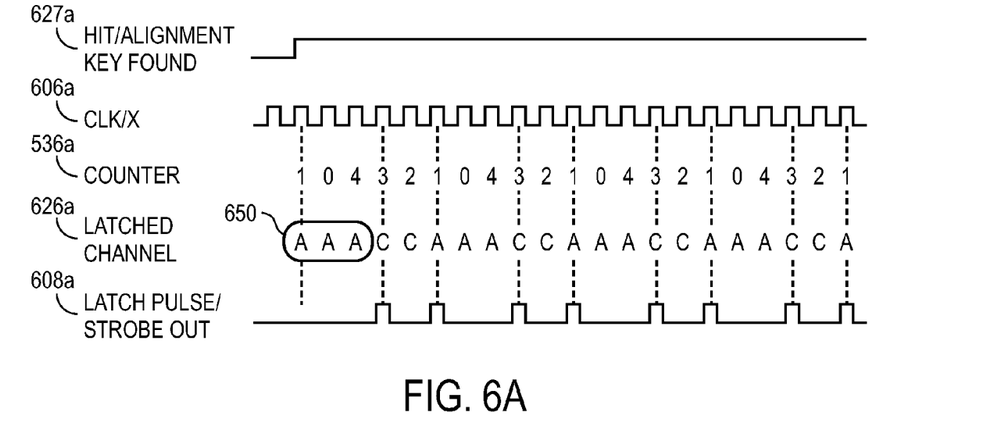
FIGS. 6a and 6b show different rotation patterns for a 4:10 word size translation scheme.
Figure 6B:
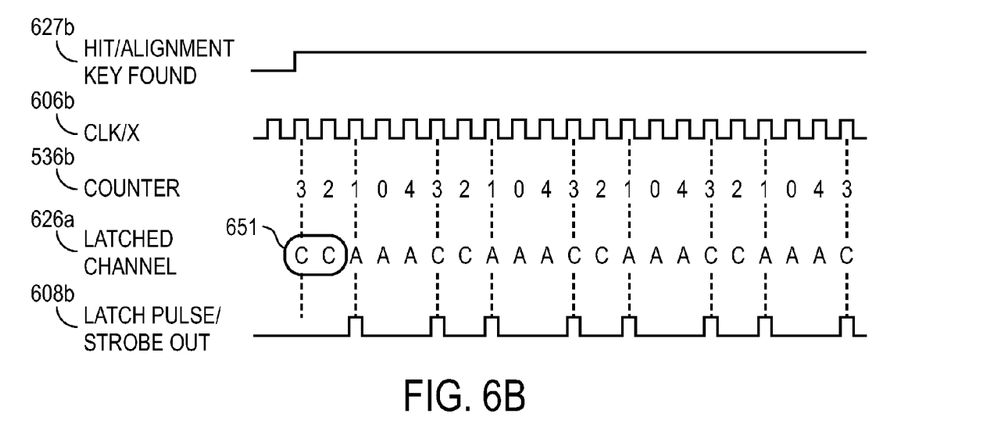

FIGS. 6a and 6b show timing diagrams for the circuitry of FIG. 5 (that, for simplicity, ignore propagation delays). FIG. 6a shows a timing diagram for an alignment key found in channel A, Figure shows a timing diagram for an alignment key found in channel C. Note that each of these timing diagrams show their respective hit lines 627a,b being latched into an activated state so as to indicate that an alignment key has been found. A delayed form of the hit line 527 is also used as the alignment key found output 509. Here, delay 543 should be tailored such that the next activating edge of the strobe output 508, after the alignment key found output 509 is activated, can be interpreted to mean that "valid" aligned data is present at the output 207 of latch 206.

The activation of the hit line 527 is used to latch input values of an alignment control circuit 540 and a rotate (timing) control circuit 541. Here, proper alignment and rotation depend upon "knowing", in some way, the initial location of the found alignment key. The activation of the hit line 527 is used to "freeze" the input values to the alignment and rotation control circuits 540, 541 so that they can henceforth properly control the channel selection and rotational aspects of the word translation scheme.

Specifically, the activation of the hit line 527 causes latch 524 to latch onto an identification of the channel that the alignment key has been found in. Here, the identification is encoded from a one hot encoded form to a binary form (e.g., 1000 to 100) by encoder 523. The activation of the hit line 527 also causes latches 530 and 531 to latch onto an indication as to whether the alignment key has been found in channels C or D (in which the output of latch 530 will be activated as a consequence of OR gate 528 indicating a logic "hi"); or, whether the alignment key has been found in channels A or B (in which the output of latch 531 will be activated as a consequence of OR gate 531 indicating a logic "hi").

Recalling the principles discussed above with respect to FIG. 4b, recall that the appropriate "other" channel to be selected besides the channel in which the alignment key is found (for any workable rotating pattern of selected channels) can be readily determined by "rolling" forward two bit positions in the buffer (where rollover from bit 12 to bit 0 is preserved) from the location where the alignment key is found. The alignment control circuit 540 uses the identity of the alignment key location: 1) as a first value to be presented to the channel select input of multiplexer 204 for a first stage of rotation; and, 2) as a input to a "roll by 2" function 525 that produces a second value to be presented to the channel select input of multiplexer 204 for a second stage of rotation. Thus, the output of multiplexer 540 identifies the correct channel for each rotation stage as a function of the identity of the channel in which the alignment key was found. Note that the embodiment of multiplexer 204 is designed to receive a channel select input in binary form—hence the presence of the one-hot to binary encoder 523. According to such an embodiment, the roll by two function 525 should also provide the identity of the "other" channel in binary form.

Multiplexer 540 is not merely responsible for providing the correct channel identities; and, instead, should be viewed as being responsible for providing the correct channel identities "at the correct instances of time". The timing as to when specific channels are selected is controlled by the timing control circuit 541. From the discussion of FIG. 4*b* recall that proper timing/operation can be achieved by triggering selection for specific channels at a specific counter value irrespective of where the alignment key is found (e.g., always triggering selection of channels A and B at a count value of "1" and always triggering selection of channels C and D at a count value of "3").

The timing and control circuit 541 of FIG. 5 conforms to this principles as functions 537 and 538 provide an activated output each time a counter 536 reaches a value of "1" and each time the counter 536 reaches a value of "3". Because the value identifying any specific channel may be presented at the output of latch 524 or at the output of the roll by two function 525 depending on the situation (e.g., if the alignment key is found in alignment channel A then the value for channel A will appear at the output of latch 524; or, if the alignment key is found in channel C then the value for channel A will appear at the output of the roll by two function 525), an additional multiplexer 544 is used to ensure that a counter value of "1" will be used to select channel A or B; and, a counter value of "3" will be used to select channel C or D.

Here, multiplexer 544 can be viewed as having two channels M and N. Channel M is used if a value of A or B appears at the output of the latch 524; or, Channel N is used if a value of A or B appears at the output of the roll by two function 525. If the channel select of multiplexer 526 is one hot encoded such that activation on input 1 causes the output of the latch 524 to be presented at output 510 and activation on input 2 causes the output of the roll by two function 525 to be presented at output 510; then, selection of channel M will cause the output of the =1? comparison logic 537 to drive input 1 of multiplexer 526; and, selection of channel N will cause the output of the =1? comparison logic 537 to drive input 2 of multiplexer 526. Likewise, selection of channel M will cause the output of the =3? comparison logic 538 to drive input 2 of multiplexer 526; and selection of channel N will cause the output of the =3? comparison logic 538 to drive input 1 of multiplexer 526.

Recall also from the discussion of FIG. 4*b* that proper timing/operation can be achieved by resetting a counter to start counting from a particular value upon reception of the alignment key and based upon the location of the alignment key (e.g., "1" for situations A and B and "3" for situations C and D). The timing control circuit 541 of FIG. 5 conforms to this principle as counter 536 is provided with the proper counter start value by multiplexer 532 upon an alignment key being found. Here, note that counter 536 is in reset unless latches 530 or 531 indicate that the alignment key has been found. Once the alignment key is found the output 535 of multiplexer 532 will provide a "1" if the alignment key is found in channels A or B (i.e., if latch 531 is activated, input 534 is selected) or a "3" if the alignment key is found in channels C or D (i.e., if latch 530 is activated, input 533 is selected). The output of multiplexer 535 provides the value to the counter 536 that it is to start counting from when it comes out of reset.

The synchronization assurance circuit 542 simply "checks" to see that each expected arrival of the alignment key is a success. Here, if inputs 520 fail at some instance to identify the alignment key at a time and location when and where the alignment key is expected to have appeared, the synchronization assurance circuit 542 can deem alignment to be lost; and, as a consequence, triggers a reset 543 which resets each of the edge triggered logic elements 522, 524, 530, 531. After reset, the alignment key identification process begins again. Note that each of the edge triggered logic elements 522, 524, 530, 531, 536 can be single edge triggered rather than dual edge triggered.

Delays 541, 542 and 543 are used to avoid racing conditions. Specifically, delay 541 delays the latch pulse (which is activated anytime the counter reaches a value of "1" or "3") to give the alignment and rotate control circuit 503 and multiplexer 204 enough time within a CLK/X cycle to present the correct buffer contents at the input 205 to latch 206. Delays 542 delay the output strobe 508 beyond the latch pulse to give the latch 206 enough time to latch the buffer values presented at its input 205. Delay 543 should be tailored to activate the alignment key found sometime before the activation of the strobe output 508. Logic gate 544 is used to prevent the presentation of an alignment key at the output of latch 206 as "valid data" by nullifying the activation of both the latch pulse 511 and the strobe output 508 each time an alignment key is in the buffer and about to be selected. The synchronization and assurance circuit 542 can be designed to trigger a "squelch" signal each time the alignment key appears. As such, values 650 and 651 of FIGS. 6*a* and 6*b* would not actually be latched by latch 206 so as to presented as a formal output value.

The discussions above bring forward general principles that can be applied to other word size translation schemes besides a 4:10 scheme. For example, the appropriate "other" channel to be selected besides the channel in which the alignment key is found (for any workable rotating pattern of selected channels) should be readily calculable as the execution of a simple rolling function (such as "roll by two" was for the 4:10 scheme discussed above). Therefore the basic architecture of FIG. 5 where a multiplexer 526 is designed to multiplex between the location of where the alignment key was found and a location specified by a simple rolling function (of which the "roll by 2" function 525 is a species) should be applicable to other word size translation schemes.

Moreover, customizing a counter's starting count value based upon where the alignment key is found (e.g., as accomplished with OR gates 528, 529, latches 530, 531 and multiplexer 535 in FIG. 5) and triggering channel selection off-of a specific count value (e.g., as observed above in the 4:10 in which channels A and B are selected with a count value of "1" and channels C and D are selected with a count value of "3") are also applicable to other word translation schemes besides a 4:10 scheme. Those of ordinary skill will be able to determine the appropriate counter modulo.

Note also that, as alluded to at the onset, the specific approach of FIG. 2 applies to an approach where the looked for alignment key is the same size as the output word (i.e., alignment key size=Y). The techniques discussed herein can be applied to cases where the output word size Y is larger than the alignment key size (e.g., an alignment key size of ten bits and an output word size Y of 20 or 40 bits). In such cases, there will still be X comparators in the bank of comparators $202_1$ and $202_x$. This follows naturally when one considers that the bank of comparators identify whether a single bit, a few bits or all bits of an input word contains the remaining portion of an alignment key.

The count values used to trigger channel selection from the buffer can be determined by: 1) counting the number of clock cycles needed to receive a full sized output word of length Y once the alignment key has been found; and then, 2) counting the number of clock cycles needed to receive a full sized output word of length Y after the first word selected after arrival of the alignment key (i.e., described in 1) above) has been found. The number of clock cycles calculated from 1) and 2) will determine the asymmetry in the output strobes signal; and, a timing circuit similar to that observed in FIG. 5 in which specific count values are identified in order to trigger channel selection may be used.

More generically, for any even X and any Y>X, if the following definitions are applied:
(i) k=the rounded down integer of Y/X (e.g., k=2 if Y/X=2.5); and,
(ii) I=k+1; then:
the buffer size=XI+((X/2)-1) for X>2; and;
(i) if the remaining portion of the alignment key is found in the upper half of the input word of size X (e.g., bits 2 or 3 in FIG. 4a) then the number of CLK/X cycles needed to strobe out the first output word after the alignment key is found is k and the number of CLK/X cycles needed to strobe out the word immediately following the first word after the alignment key is I; and, the number of clock cycles then alternate in succession by k,I,k, etc., and channel selection is based upon a "roll by X/2" function; or, (ii) if the remaining portion of the alignment key is found in the lower half of the input word of size X (e.g., bits 0 or 1 in FIG. 4a) then the number of CLK/X cycles needed to strobe out the first output word after the alignment key is found is I and the number of CLK/X cycles needed to strobe out the word immediately following the first word after the alignment key is k; and, the number of clock cycles then alternate in succession by I,k,I, etc., and channel selection is based upon a "roll by X/2" function;

Note that the 4:10 values plug-in to the generic design rules provided above. That is, for X=4 and Y=10
(i) k=the rounded down integer of Y/X=10/4=2.5→2; and,
(ii) I=k+1=2+1=3; then:
the buffer size XI+((X/2)-1)=4(3)+((4/2)-1)=12+1=13; and;
(i) if the remaining portion of the alignment key is found in the upper half of the 4 bit input word (e.g., bits 2 or 3 in FIG. 4a) then the number of CLK/X cycles needed to strobe out the first output word after the alignment key is found is 2 and the number of CLK/X cycles needed to strobe out the word immediately following the first word after the alignment key is 3; and, the number of clock cycles then alternate in succession by 2, 3, 2, etc., and channel selection is based upon a "roll by 4/2"="roll by 2" function; or,
(ii) if the remaining portion of the alignment key is found in the lower half of the 4 bit input word (e.g., bits 0 or 1 in FIG. 4a) then the number of CLK/X cycles needed to strobe out the first output word after the alignment key is found is 3 and the number of CLK/X cycles needed to strobe out the word immediately following the first word after the alignment key is 2; and, the number of clock cycles then alternate in succession by 3, 2, 3, etc., and channel selection is based upon a "roll by 4/2"="roll by 2" function.

Here, for the 4:10 scheme: (i) just above corresponds to the alignment key being found in channel C or D; and (ii) just above corresponds to the alignment key being found in channel A or B.

Note also that embodiments of the present description may be implemented not only within a semiconductor chip but also within machine readable media. For example, the designs discussed above may be stored upon and/or embedded within machine readable media associated with a design tool used for designing semiconductor devices. Examples include a circuit description formatted in the VHSIC Hardware Description Language (VHDL) language, Verilog language or SPICE language. Some circuit description examples include: a behaviorial level description, a register transfer level (RTL) description, a gate level netlist and a transistor level netlist. Machine readable media may also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:
1. A method, comprising:
loading X bits at a time into a shift register and shifting groups of older, loaded X bits up in said shift register with each new group of loaded X bits, each group of X bits having been received from a serial data stream;
identifying an alignment key within said shift register; and,
presenting aligned data from said serial data stream by rotating selection of a first group of Y contiguous bits from said shift register and a second group of Y contiguous bits from said shift register after said identifying, Y being greater than X.
2. The method of claim 1 wherein said rotating further comprises selecting said first and second groups of Y contiguous bits with a multiplexer.
3. The method of claim 2 wherein said selecting further comprises providing to said multiplexer's channel select input, in a rotated fashion, the identity of said first group of Y contiguous bits and the identity of said second group of Y contiguous bits.

4. The method of claim 1 wherein said rotating is asymmetrical in that a first time period following selection of said second group of Y contiguous bits up to selection of said first group of Y contiguous bits is different than a second time period following selection of said first group of Y contiguous bits up to selection of said second group of Y contiguous bits.

5. The method of claim 1 wherein said shift register is sized to hold Z bits where:

$$Z=XI=((X/2)-1)$$

and where:
(i) k= the rounded down integer of Y/X; and,
(ii) l=k+1.

6. The method of claim 1 further comprising loading a value into a counter for said counter to start from, said value based upon where said alignment key is found within said shift register.

7. The method of claim 6 further comprising triggering the timing of said selection of said first group of Y contiguous bits upon said counter reaching a first value and triggering the timing of said selection of said second group of Y contiguous bits upon said counter reaching a second value.

8. The method of claim 7 wherein said first group of Y contiguous bits is the first group of Y bits to follow said alignment key in said serial data stream and said second group of Y contiguous bits is the second group of Y bits to follow said first group in said serial data stream.

9. An apparatus, comprising:
a parallel load shift register to receive a new input word of X bits;
X comparators, each comparator coupled to receive a different set of one or more contiguous bits of said new input word of X bits, each comparator to identify an alignment key located within said shift register;
a plurality of channels, each channel encompassing a different selection of Y contiguous bits within said shift register, each channel flowing to a different input of a first multiplexer, Y being greater than X; and,
a control circuit coupled to an output from each of said comparators, said control circuit comprising a second multiplexer whose output is coupled to a channel select input of said first multiplexer, said second multiplexer having a first input to identify a first of said channels and a second input to identify a second of said channels, said control circuit comprising a counter whose output is coupled to comparison logic, said comparison logic coupled to a channel select input of said second multiplexer to control the timing of when said first channel is selected by said first multiplexer and when said second channel is selected by said first multiplexer.

10. The apparatus of claim 9 further comprising a latch whose input is coupled to said first multiplexer's output.

11. The apparatus of claim 10 wherein said comparison logic is coupled to said latch's clocking input so as to cause said latch to latch the content of said first multiplexer's output when said first channel is selected by said first multiplexer and when said second channel is selected by said first multiplexer.

12. The apparatus of claim 9 wherein said counter has an input to receive a value where said counter should start counting from, said counter input coupled to an output of a third multiplexer, said third multiplexer having a first input to provide a first value where said counter should start counting from, said third multiplexer having a second input to receive a second value where said counter should start counting from.

13. The apparatus of claim 12 where said third counter has a channel select input coupled to receive an indication whether a remaining portion of said alignment key resides within a first half of said new input word of X bits or a second half of said new input word of X bits, said first value to be provided to said counter if said remaining portion of said alignment key resides within said first half, said second value to be provided to said counter if said remaining portion of said alignment key resides within said second half.

14. The apparatus of claim 9 wherein said first input is coupled to a circuit that identifies where said alignment key has been found in said shift register.

15. The apparatus of claim 14 wherein said circuit comprises a latch and is coupled to an output from each of said comparators.

16. The apparatus of claim 15 further comprising logic circuitry that performs a roll by X/2 function, said logic circuitry having an input coupled to said circuit and an output coupled to said second input.

17. The apparatus of claim 9 wherein said shift register is sized to hold Z bits where:

$$Z=XI=((X/2)-1)$$

and where:
(i) k the rounded down integer of Y/X; and,
(ii) I=k+1.

18. An apparatus, comprising:
a) a connector to receive an optical fiber;
b) a serial to parallel converter having an input coupled to said connector and an output that provides X bits at a time from said optical fiber; and,
c) an alignment key synchronization circuit, comprising:
(i) a parallel load shift register to receive a new input word of X bits from said serial to parallel converter;
(ii) X comparators, each comparator coupled to receive a different set of one or more contiguous bits of said new input word of X bits, each comparator to identify an alignment key located within said shift register;
(iii) a plurality of channels, each channel encompassing a different selection of Y contiguous bits within said shift register, each channel flowing to a different input of a first multiplexer, Y being greater than X;
(iv) a control circuit coupled to an output from each of said comparators, said control circuit comprising a second multiplexer whose output is coupled to a channel select input of said first multiplexer, said second multiplexer having a first input to identify a first of said channels and a second input to identify a second of said channels, said control circuit comprising a counter whose output is coupled to comparison logic, said comparison logic coupled to a channel select input of said second multiplexer to control the timing of when said first channel is selected by said first multiplexer and when said second channel is selected by said first multiplexer.

19. The apparatus of claim 18 further comprising a latch whose input is coupled to said first multiplexer's output.

20. The apparatus of claim 19 wherein said comparison logic is coupled to said latch's clocking input so as to cause said latch to latch the content of said first multiplexer's output when said first channel is selected by said first multiplexer and when said second channel is selected by said first multiplexer.

21. The apparatus of claim 18 wherein said counter has an input to receive a value where said counter should start counting from, said counter input coupled to an output of a third multiplexer, said third multiplexer having a first input to provide a first value where said counter should start counting from, said third multiplexer having a second input to receive a second value where said counter should start counting from.

22. The apparatus of claim 21 where said third counter has a channel select input coupled to receive an indication whether a remaining portion of said alignment key resides within a first half of said new input word of X bits or a second half of said new input word of X bits, said first value to be provided to said counter if said remaining portion of said alignment key resides within said first half, said second value to be provided to said counter if said remaining portion of said alignment key resides within said second half.

23. The apparatus of claim 18 wherein said first input is coupled to a circuit that identifies where said alignment key has been found in said shift register.

24. The apparatus of claim 23 wherein said circuit comprises a latch and is coupled to an output from each of said comparators.

25. The apparatus of claim 24 further comprising logic circuitry that performs a roll by X/2 function, said logic circuitry having an input coupled to said circuit and an output coupled to said second input.

26. The apparatus of claim 18 wherein said shift register is sized to hold Z bits where:

$$Z = XI = ((X/2)-1)$$

and where:
(i) k the rounded down integer of Y/X; and,
(ii) I=k+1.

27. An apparatus, comprising:
a serial data channel;
a shift register coupled downstream from said serial data channel, said shift register to shift up older groups of X bits that passed through said serial data channel in response to said shift register's reception of each new group of X bits that passed through said serial data channel after said older groups of X bits;
comparison circuitry coupled to said shift register to identify an alignment key within said shift register;
a first multiplexer coupled to said shift register to provide aligned data from said serial data channel by rotating its selection from said shift register of a first group of Y contiguous bits from said shift register and a second group of Y contiguous bits from said shift register, where Y is greater than X.

28. The apparatus of claim 27 further comprising a separate channel between said shift register and said first multiplexer for each different group of Y contiguous bits within said shift register that include a different set of X bits from said serial data channel.

29. The apparatus of claim 28 further comprising a second multiplexer having an output coupled to a channel select input of said first multiplexer, said second multiplexer having a first input to receive a first identifier of said first group of Y continuous bits, said second multiplexer having a second input to receive a second identifier of a second group of Y contiguous bits.

* * * * *